(12) United States Patent
Hsu et al.

(10) Patent No.: US 8,336,417 B2
(45) Date of Patent: Dec. 25, 2012

(54) CHAIN FOR A MOTION TRANSMISSION APPARATUS

(75) Inventors: Po-Chuan Hsu, Taichung (TW); Yan-Yu Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 13/213,431

(22) Filed: Aug. 19, 2011

(65) Prior Publication Data

US 2011/0296940 A1    Dec. 8, 2011

Related U.S. Application Data

(63) Continuation-in-part of application No. 12/510,886, filed on Jul. 28, 2009, now abandoned.

(51) Int. Cl.
*F16H 25/22* (2006.01)

(52) U.S. Cl. ........ 74/424.88; 384/51; 384/523; 384/623

(58) Field of Classification Search ............... 74/424.82, 74/424.81, 424.83, 424.84, 424.87, 424.88; 384/38, 45, 49, 51, 487, 903, 523, 623, 37; *F16H 25/22*
See application file for complete search history.

(56) References Cited

U.S. PATENT DOCUMENTS

| | | | |
|---|---|---|---|
| 5,993,064 A | 11/1999 | Teramachi et al. | |
| 6,095,009 A * | 8/2000 | Takagi | 74/424.88 |
| 6,779,923 B2 * | 8/2004 | Murata | 384/44 |
| 2001/0038724 A1 * | 11/2001 | Murata | 384/44 |
| 2004/0141670 A1 * | 7/2004 | Gotoh | 384/523 |
| 2006/0008192 A1 * | 1/2006 | Sekimoto et al. | 384/523 |
| 2006/0067594 A1 * | 3/2006 | Wu et al. | 384/51 |
| 2007/0201777 A1 * | 8/2007 | Wu et al. | 384/51 |
| 2008/0019622 A1 * | 1/2008 | Chen | 384/51 |

FOREIGN PATENT DOCUMENTS

JP    2607993 B2    5/1997

* cited by examiner

Primary Examiner — Troy Chambers
Assistant Examiner — Valentin Craciun

(57) ABSTRACT

A chain for a motion transmission apparatus comprises a plurality of spacers and two links two links at both sides of the respective spacers for connecting spacers together. The spacers are equidistantly spaced from one another by a receiving space which is longitudinally asymmetrical and provided for holding rolling elements.

5 Claims, 7 Drawing Sheets

CHAIN FOR A MOTION TRANSMISSION APPARATUS

This application is a continuation of part of U.S. patent application Ser. No. 12/510,886, filed Jul. 28, 2009, now abandoned. Claim 1 of this application is revised from a combination of claims 11-13 of the U.S. patent application Ser. No. 12/510,886, claims 2-6 correspond to claims 17-20 of the U.S. patent application Ser. No. 12/510,886, and claim 7 of this application is new.

BACKGROUND OF THE INVENTION

1. Field of the Invention

The present invention relates to a motion transmission apparatus, and more particularly to a chain for a motion transmission apparatus.

2. Description of the Prior Art

Currently a type of motion transmission apparatus with a chain has been invented to reduce the noise of the motion transmission apparatus and the friction between the rolling elements, wherein the rolling elements are received in the chain so that they can be prevented from impacting one another, thus reducing the generation of noise. Furthermore, the rolling elements are prevented from contacting each other so that the friction between the rolling elements is also reduced, which, as a result, extends the service life while ensuring a precise and smooth operation of the chain.

Although the transmission apparatus with a chain has a lot of advantages, it might stop the rolling elements from moving smoothly while reducing the precision of the rolling elements' motion and causing severe damage if the structural design of the chain is not in line with the motion track of the motion transmission apparatus. For example, U.S. Pat. No. 5,993,064 discloses a chain structure which has two cross-shaped structures at both ends thereof and is provided with two strings of serially-connected and crosswise arranged rings. This chain structure is in arc-shaped line contact with the rolling elements, and it is impossible for the chain to be turned or twisted when the motion transmission apparatus is moving along its complicated motion track because these rings will be subjected to pressure and tensile deformation and cause interference with the inner surface of the motion track, which is likely to cause rupture of the chain and bad circulation of the rolling elements. Another conventional chain structure is disclosed in JP Pat. No. 2607993 and comprises a plurality of spacers connected by two links. Both sides of each spacer are defined with a concave (also called retaining surface) which is in arc-shaped line contact with the rolling elements. When the chain structure moves along the twisted or curved endless circulation path, the concave of the spacers is unable to keep in full contact with the rolling elements. Furthermore, when moving through a curved path, the deformation of the chain will make the spacers shift toward the inner side of the curved path, as a result, the spacers will rub against the inner surface of the path, causing friction, which will further result in a bad circulation of the rolling elements.

The present invention has arisen to mitigate and/or obviate the afore-described disadvantages.

SUMMARY OF THE INVENTION

The primary object of the present invention is to provide a chain which is capable of keeping contacting the rolling element when moving in a twisted and/or curved endless circulation path, furthermore, the chain is capable of being twisted or turned and can be prevented from interfering with the inner surface of the endless circulation path.

To achieve the above object, a motion transmission apparatus with a chain in accordance with the present invention comprises:

an elongated shaft defined with a rolling groove;

a movable member defined with an accommodation portion for insertion of the elongated shaft, and in the accommodation portion being formed a rolling groove for cooperating with the rolling groove of the elongated shaft to form a load path;

at least one circulating member fixed on the movable member and defined with a return path which is connected to the load path to form an endless circulation path;

a plurality of rolling elements received in the endless circulation path as a transmission medium between the elongated shaft and the movable member;

a chain including a plurality of spacers and two links two links, each of the spacers including a longitudinal direction and a transverse direction, one side of each of the spacers in the longitudinal direction being convex, and another side of each of the spacers in the longitudinal direction being concave, and the both sides of each of the spacers in the longitudinal direction being V or U-shaped, the two links being located at both ends of the respective spacers in the transverse direction to hold the spacers together in such a manner that the spacers are equidistantly spaced from one another by a receiving space which is provided for holding the rolling elements;

wherein the concave one side of each of the spacers is formed with a first retaining surface, and the concave another side of each of the spacers is formed with more than one second retaining surface, and the first and second retaining surfaces are all in contact with the rolling elements;

more than one oil-storage space appears in each of the receiving spaces for storage of lubricant oil, after the rolling element are received in the receiving spaces.

To achieve the above object, a chain for a motion transmission apparatus in accordance with the present invention comprises: a plurality of spacers and two links two links at both sides of the respective spacers for connecting spacers together, the spacers being equidistantly spaced from one another by a receiving space which is longitudinally asymmetrical and provided for holding rolling elements.

Each of the spacers is provided at one side thereof in a longitudinal direction thereof with a first retaining surface, and at another side thereof with more than one (or two) second retaining surfaces (which can be arc-shaped or polygonal-shaped), the first and second retaining surfaces are all in contact with the rolling elements. All positions where the first and second retaining surfaces are in contact with the rolling elements are in the same plane. More than one oil-storage space exists in each of the receiving spaces for providing sufficient lubricant oil to the rolling elements, after the rolling elements are received in the receiving spaces. The chain is approximately rectangular-shaped. The height of each of the spacers is 0.35-0.45, and optimally 04, of a diameter of the rolling elements. The height of each of the spacers is optimally 0.4 of the diameter of the rolling elements, and the height of each of the links is optimally equal to the height of the spacers. Therefore, as compared to the conventional chain structure, the chain of the present invention can move in a smoother way when moving in a twisted and/or curved endless circulation path, because the spacers of the conventional chain structure are relatively high and in arc-shaped line contact with the rolling elements, and as a result, the spacers of the conventional chain structure will be in contact with the rolling elements via a single edge when moving in a twisted and/or curved endless circulation path, so that the spacers are unevenly stressed, which will accelerate the wear of the spacers and reduce the service life of the chain.

Finally, after the chain of the present invention is installed in the endless circulation path, a first and a second ends of the chain can be jointed to each other (by convex and concave engagement means, interference fit, ultrasonic welding, glue and etc) to form an endless chain, so as to prevent both ends of the chain from interfering with the endless circulation path and accordingly ensure a smooth circulation.

DETAILED DESCRIPTION OF THE PREFERRED EMBODIMENTS

Figure 1:
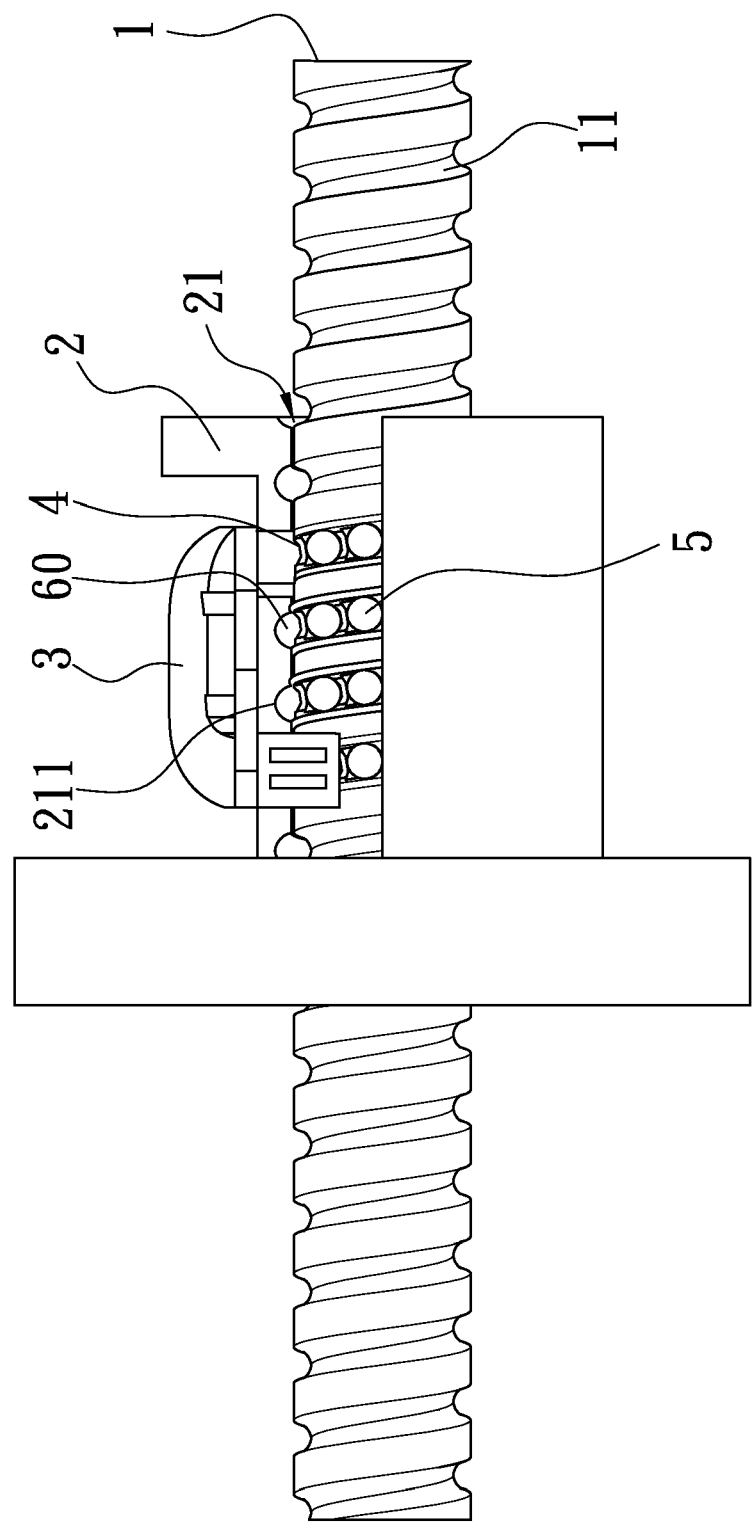
FIG. 1 is a partial cross sectional view of a chain for a motion transmission apparatus in accordance with the present invention.

The present invention will be clearer from the following description when viewed together with the accompanying drawings, which show, for purpose of illustrations only, the preferred embodiment in accordance with the present invention.

Referring to FIGS. 1-7, a chain for a motion transmission apparatus in accordance with the present invention comprises: an elongated shaft 1, a movable member 2, at least a circulating member 3, a plurality of rolling elements 5, and a chain 4.

The elongated shaft 1 is defined with a rolling groove 11.

The movable member 2 is defined with an accommodation portion 21 for insertion of the elongated shaft 1, and in the accommodation portion 21 is formed a rolling groove 211 for cooperating with the rolling groove 11 of the elongated shaft 1 to form a load path 60.

The circulating member 3 is fixed on the movable member 2 and defined with a return path (not shown) which is connected to the load path 60 to form an endless circulation path.

The rolling elements 5 are received in the endless circulation path as a transmission medium between the elongated shaft 1 and the movable member 2.

Figure 5:
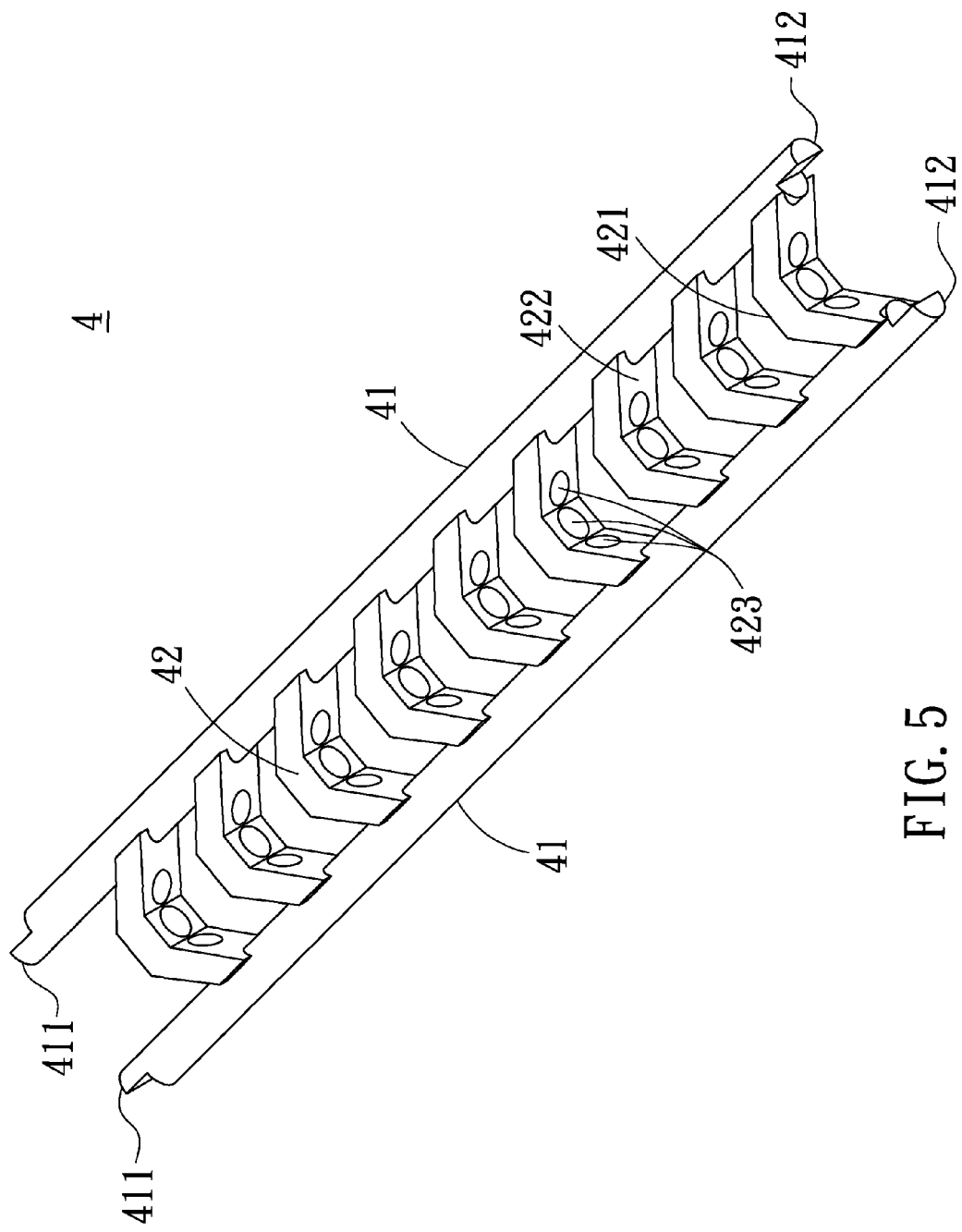
FIG. 5 is a perspective view of a chain (the spacers of which are provided with through holes) in accordance with the present invention.
Figure 6:
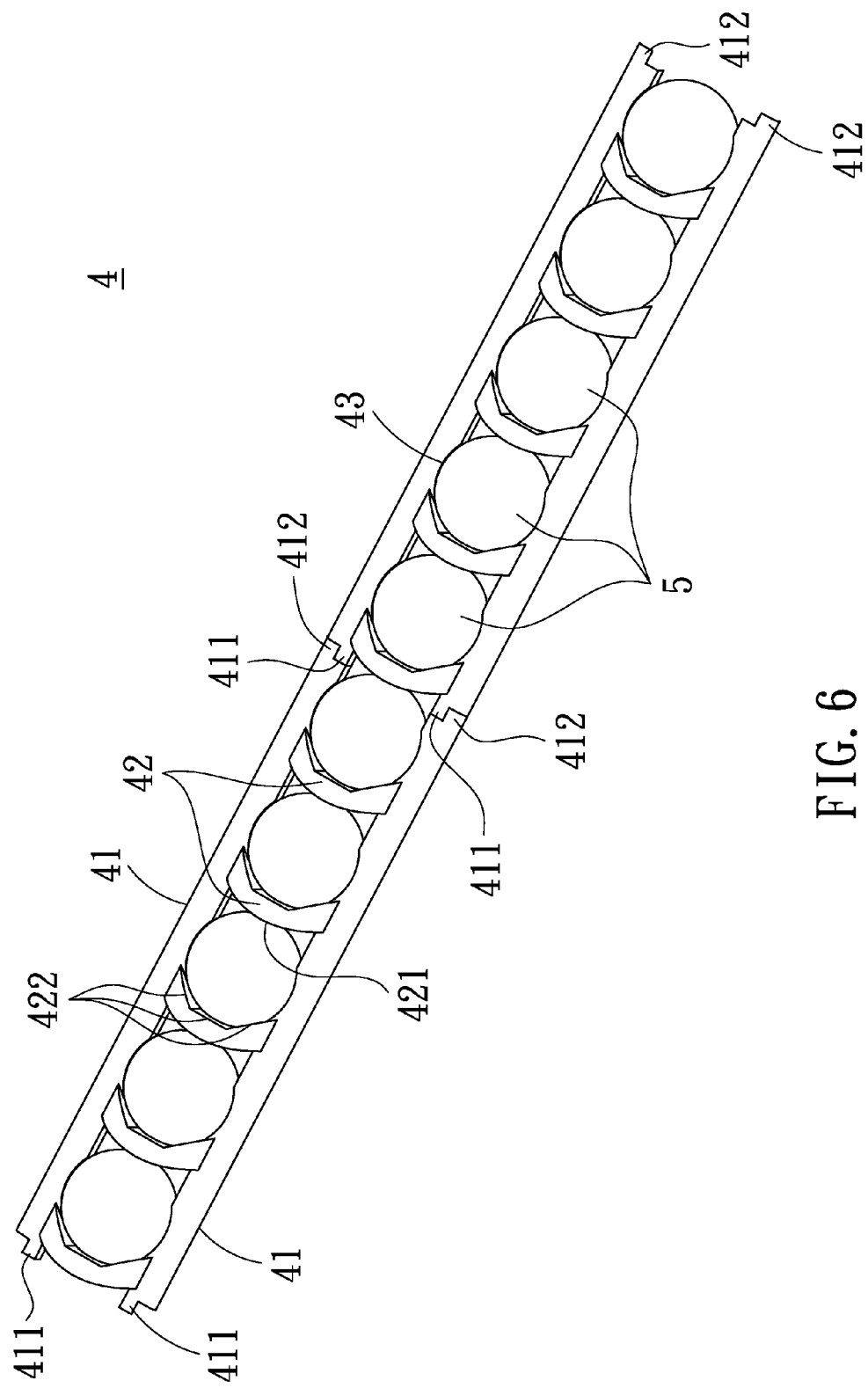
FIG. 6 shows that a chain in accordance with the present invention has its first end connected to a second end of another chain.
Figure 7:
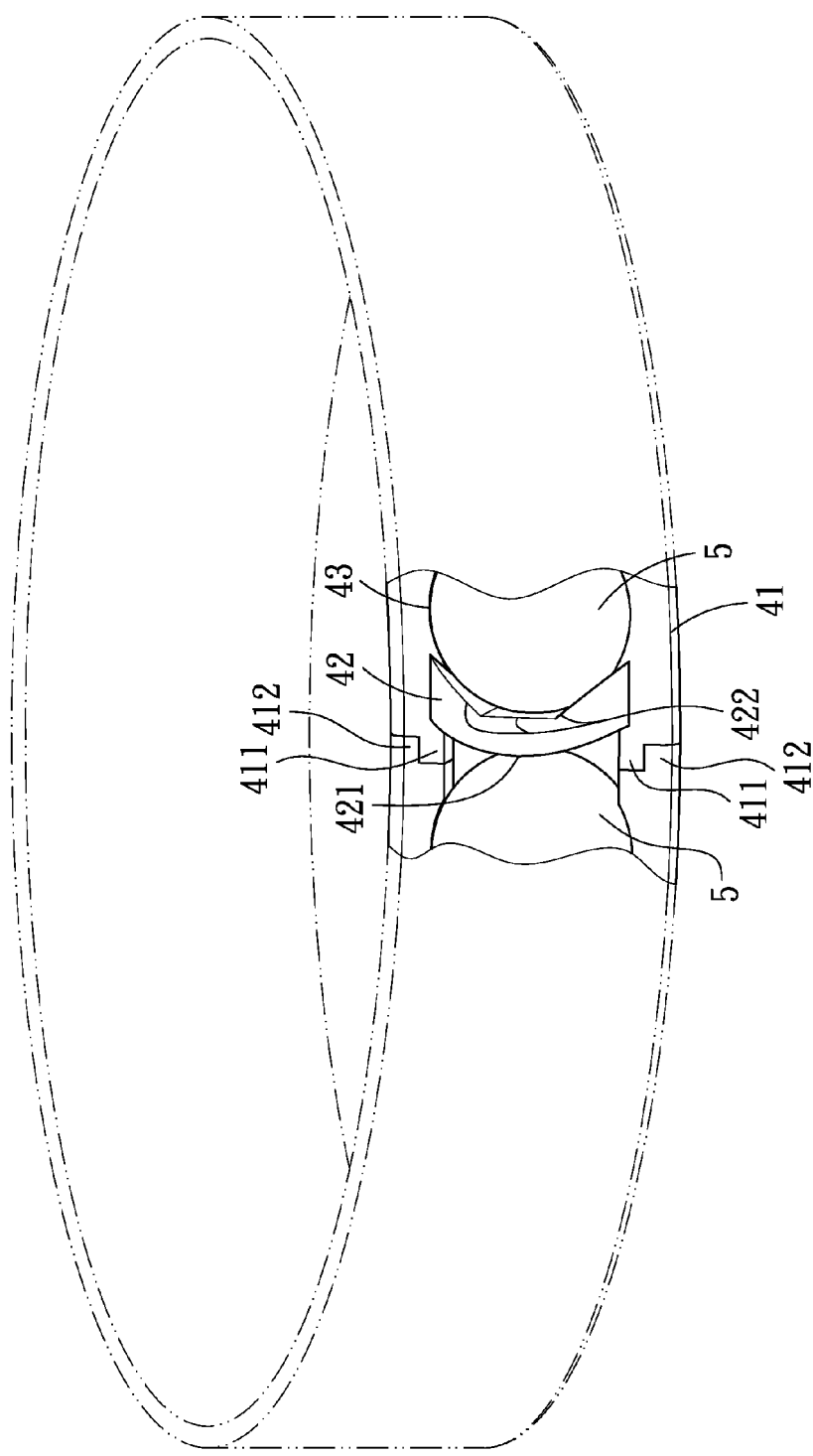
FIG. 7 shows that the first and second ends of a chain in accordance with the present invention are connected to each other.

The chain 4 includes a plurality of spacers 42 and two links 41 at both sides of the respective spacers 42 for connecting them together. Each spacer 42 includes a longitudinal direction G and a transverse direction Y, one side of the each spacer 42 in the longitudinal direction is a convex structure which is formed with a first retaining surface 421, and another side of the spacer 42 in the longitudinal direction is a concave structure which is formed with more than one second retaining surface 422. The two links 41 are located at both ends of the respective spacers 42 in the transverse direction to hold the spacers together in such a manner that the spacers 42 are in parallel to and equidistantly spaced from one another by a receiving space 43 which is provided for holding the rolling elements 5, and the convex side of each of the spacers 42 is located toward the concave side of a corresponding neighboring spacer 42. The first and second retaining surfaces 421, 422 are all flat and simultaneously held in a point-to-point contact with the rolling elements 5. In addition, all the positions where the first and second retaining surface 421, 422 contact the rolling elements 5 are in the same plane. Referring then to FIG. 5, the first and second retaining surfaces 421, 422 can also be defined with through holes 423 (or grooves), which allow the first and second retaining surfaces 421, 422 to hold the rolling elements more stably.

Figure 3:
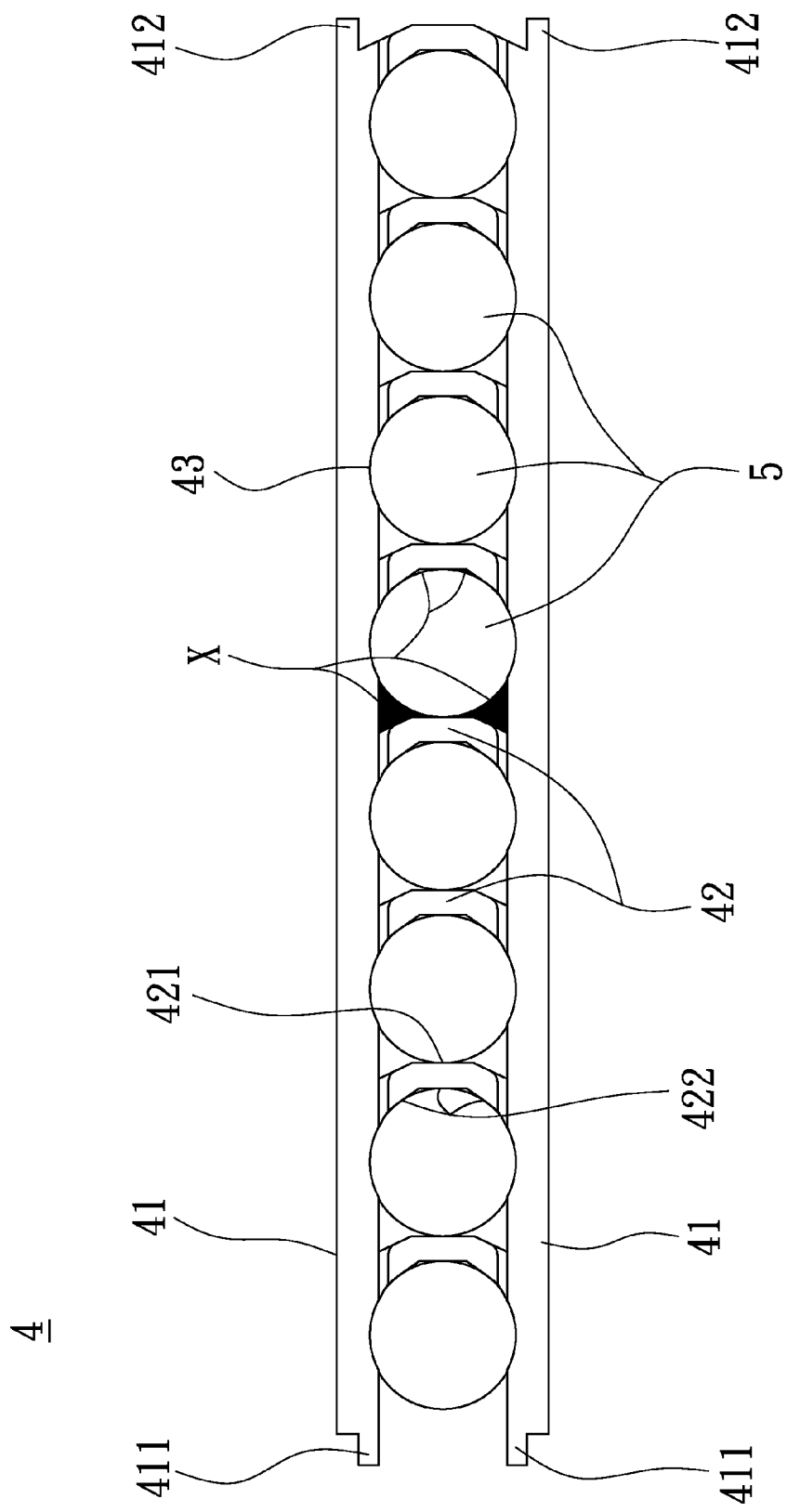
FIG. 3 is a top view showing that rolling elements are installed in the chain in accordance with the present invention.
Figure 4:
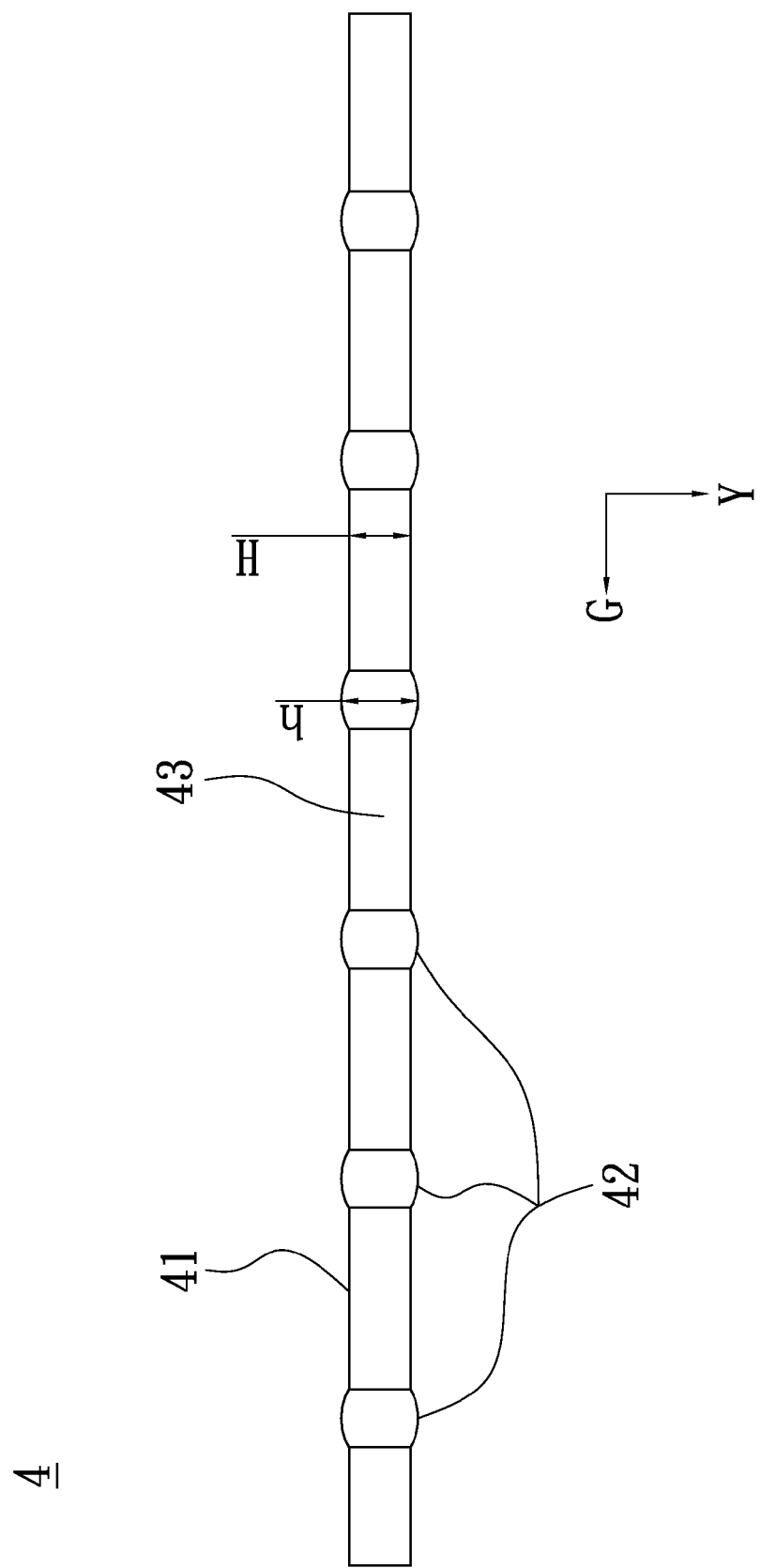
FIG. 4 is a side view of the chain in accordance with the present invention.

Referring then to FIG. 3, the spacers 42 are approximately U-shaped so that each of the receiving spaces 43 is longitudinally asymmetrical, and after rolling element 5 are received in the receiving spaces 43, more than one oil-storage space X will appear in each of the receiving spaces 43 for providing the rolling element 5 with sufficient lubricant oil. Referring then to FIG. 4, the height h of the each spacer 42 is 0.35-0.45, and optimally 0.4, of the diameter of the rolling elements 5, and the height H of the links 41 can also be optimally equal to the height h of the each spacer 42. As compared to the conventional chain structure, the chain of the present invention can move in a smoother way when moving in a twisted and/or curved endless circulation path, because the spacers of the conventional chain structure are relatively high and in arc-shaped line contact with the rolling elements, and as a result, the spacers of the conventional chain structure will be in contact with the rolling elements via a single edge when moving in a twisted and/or curved endless circulation path, so that the spacers are unevenly stressed, which will accelerate the wear of the spacers and reduce the service life of the chain.

Figure 2:
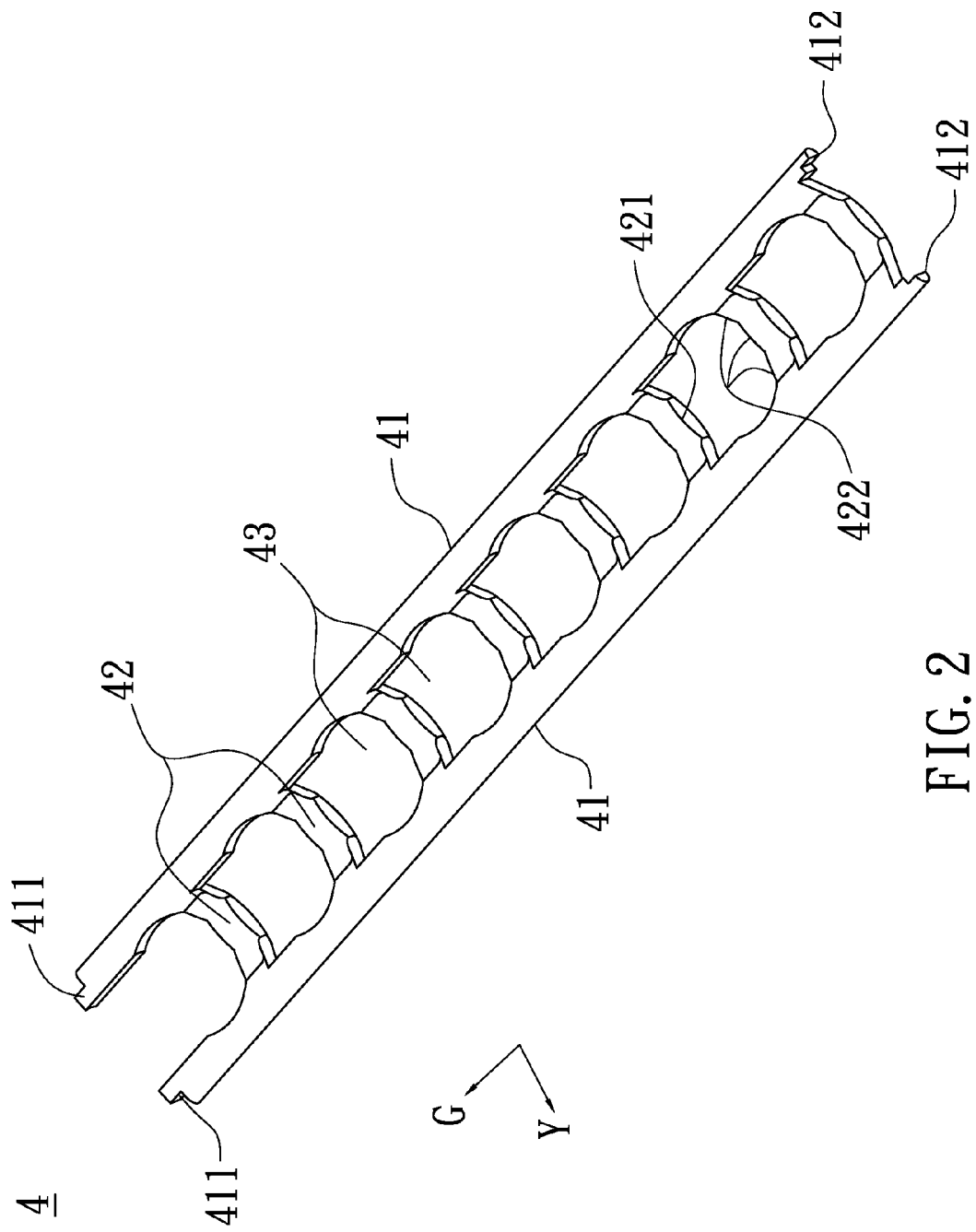
FIG. 2 is a perspective view of a chain (the spacers of which don't have through holes) in accordance with the present invention.

Finally, referring to FIGS. 2, 3 and 5, after the chain 4 of the present invention is installed in the endless circulation path, a first and a second ends 411, 412 of the chain 4 can be jointed to each other (by convex and concave engagement means, interference fit, ultrasonic welding, glue and etc) to form an endless chain, so as to prevent both ends of the chain from interfering with the endless circulation path and accordingly ensure a smooth circulation.

To summarize, the structural design of the chain reduces the contact area between the chain and the rolling elements, so as to reduce the friction coefficient therebetween. In addition, the height design of the spacers ensures that the chain can move smoothly without causing interference with the endless circulation path whenever it is twisted or turned, thus extending the service life of the chain.

While we have shown and described various embodiments in accordance with the present invention, it is clear to those skilled in the art that further embodiments may be made without departing from the scope of the present invention.

What is claimed is:

1. A chain for a motion transmission apparatus being mounted on the motion transmission apparatus which consists of an elongated shaft, a movable member, at least one circulating member, a plurality of rolling elements;

the chain comprising a plurality of spacers and two links, each of the spacers including a longitudinal direction and a transverse direction, one side of each of the spacers in the longitudinal direction being convex, and another side of each of the spacers in the longitudinal direction being concave, and the both sides of each of the spacers in the longitudinal direction being V or U-shaped, the two links being located at both ends of the respective spacers in the transverse direction to hold the spacers together in such a manner that the spacers are in parallel to and equidistantly spaced from one another by a receiving space which is provided for holding the rolling elements, and the convex side of each of the spacers is located toward the concave side of a corresponding neighboring spacer;

wherein the convex side of each of the spacers is formed with a first retaining surface, and the concave side of each of the spacers is formed with more than one second retaining surface, the first and second retaining surfaces are all flat and simultaneously held in point-to-point contact with the rolling elements, all positions where the first and second retaining surfaces are in contact with the rolling elements are in the same plane;

more than one oil-storage space appears in each of the receiving spaces for storage of lubricant oil, after the rolling elements are received in the receiving spaces, and a height of each of the spacers is 0.35-0.45 of a diameter of the rolling elements.

2. The chain for a motion transmission apparatus as claimed in claim 1, wherein the height of each of the spacers is optimally 0.4 of the diameter of the rolling elements.

3. The chain for a motion transmission apparatus as claimed in claim 1, wherein a height of each of the links is equal to the height of the spacers.

4. The chain for a motion transmission apparatus as claimed in claim 1, wherein the chain has a first and a second ends which are jointed to each other.

5. The chain for a motion transmission apparatus as claimed in claim 1, wherein the chain has a first and a second ends, the first end of the chain is jointed to a second end of another chain.

* * * * *